Figure 1:
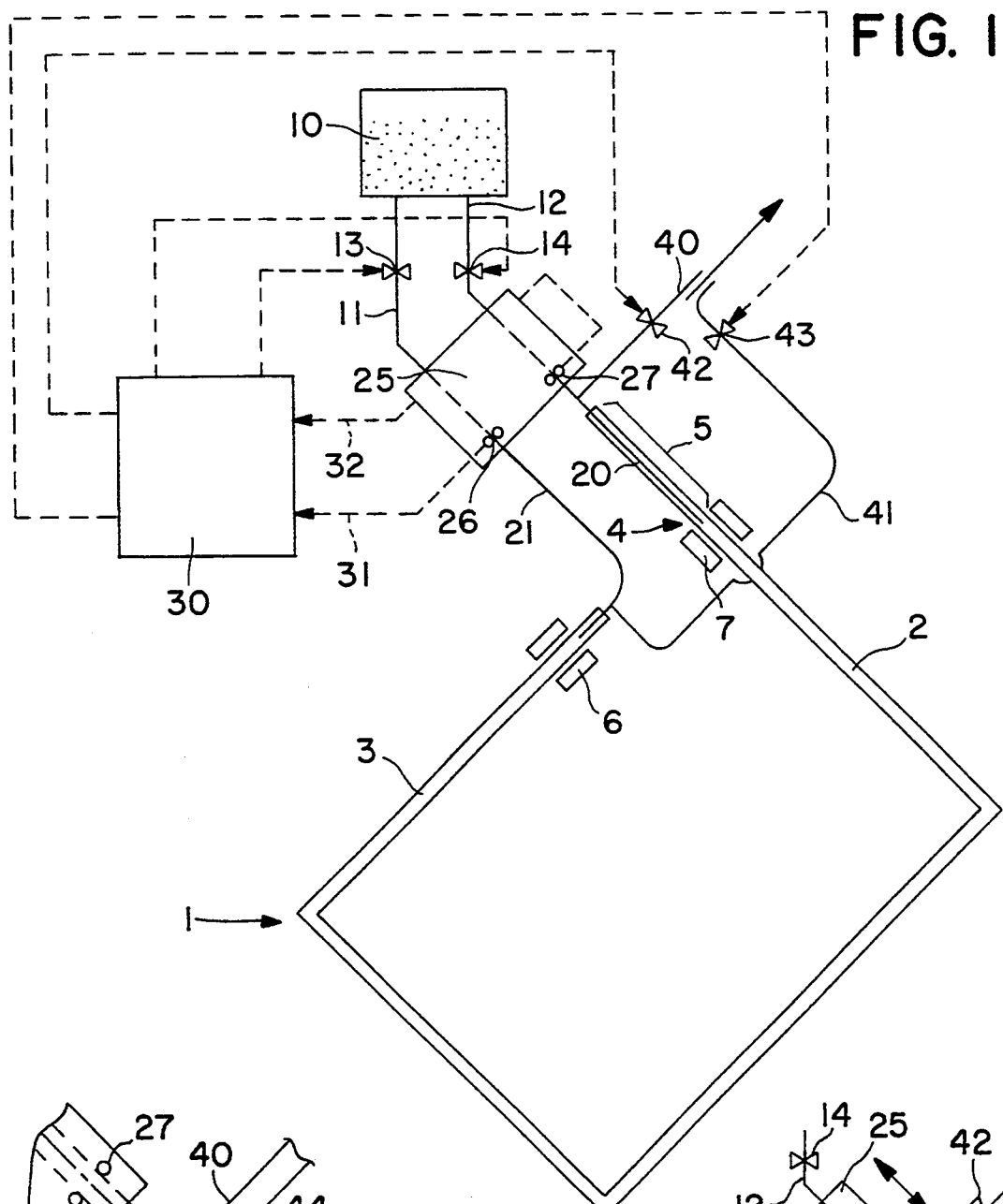

United States Patent [19]

Lisec

[11] Patent Number: 5,390,406
[45] Date of Patent: Feb. 21, 1995

[54] PROCESS AND APPARATUS FOR THE PARTIAL FILLING OF SPACER FRAMES WITH MATERIAL

[76] Inventor: Peter Lisec, Bahnhofstrasse 34, A-3363 Amstetten-Hausmening, Australia

[21] Appl. No.: 194,385

[22] Filed: Feb. 10, 1994

[30] Foreign Application Priority Data

Mar. 12, 1993 [AT] Austria ................................... 489/93

[51] Int. Cl.6 .......................................... B23Q 17/00
[52] U.S. Cl. ........................................ 29/407; 29/709; 29/714; 29/DIG. 3; 52/172; 141/95; 53/503
[58] Field of Search ................. 29/407, 705, 714, 709, 29/527.1, 527.4, 530, 505, DIG. 3; 52/172; 141/94, 95, 96; 406/10, 12, 19, 21, 28, 29, 31; 53/503, 504, 284.5

[56] References Cited

U.S. PATENT DOCUMENTS

| | | | |
|---|---|---|---|
| 3,624,628 | 11/1971 | Schmidt | 141/96 |
| 3,799,622 | 3/1974 | Hek | 406/28 |
| 3,841,138 | 10/1974 | Zinnbauer et al. | 72/369 |
| 4,347,876 | 9/1982 | Morgan | 141/94 |
| 4,660,271 | 4/1987 | Lenhardt | 29/527.4 |
| 4,670,954 | 6/1987 | Lisec | 29/564.1 |
| 4,698,891 | 10/1987 | Borys | 52/172 |
| 4,704,512 | 11/1987 | Lisec . | |
| 4,912,837 | 4/1990 | Bayer | 29/451 |
| 4,947,537 | 8/1990 | Lisec | 29/527.1 |
| 4,997,013 | 3/1991 | Peckels | 141/96 |
| 5,134,279 | 7/1992 | Lisec | 250/223 R |
| 5,136,871 | 8/1992 | Lisec . | |

FOREIGN PATENT DOCUMENTS

| | | | |
|---|---|---|---|
| 341627 | 11/1989 | European Pat. Off. | 141/94 |
| 0435076 | 7/1991 | European Pat. Off. . | |
| 3842579 | 6/1990 | Germany | 141/95 |

Primary Examiner—Mark rosenbaum
Assistant Examiner—David P. Bryant
Attorney, Agent, or Firm—Young & Thompson

[57] ABSTRACT

A spacer frame consisting of a hollow profile strip bent three times and still open at the fourth corner, wherein one leg (2) is longer than the other leg leading to the open corner, is filled with granulated desiccant by way of a probe (20) introduced into the leg (2). The probe (20) extends with its front end (20)into the leg (2') up to the desired filling level. As soon as the desiccant in the leg (2) has reached the probe (20), the feeding flow of desiccant ceases. This is detected by a sensor (27). The sensor (27) actuates the pulling out of the probe (20). During this step, a vacuum is applied to the probe (20) a distance from the front end (201) of the probe via a conduit (40) so that no desiccant can exit from the probe (20).

13 Claims, 1 Drawing Sheet

PROCESS AND APPARATUS FOR THE PARTIAL FILLING OF SPACER FRAMES WITH MATERIAL

The invention relates to a process for the partial filling of hollow members with granulated material and to an apparatus for performing this process.

Especially when filling spacer frames for insulating glass panes, consisting of one piece or of several pieces of hollow profile strips, with granular desiccant (molecular sieve) the problem arises frequently that the hollow profile strip(s) forming the spacer frame must not be filled up to its or their end(s) in order to permit connecting of the hollow profile strip, for example by the insertion of linear connectors or corner connectors.

It has been known from U.S. Pat. No. 4,91 2,837 to fill spacer frames bent at three corners with a desiccant by way of the frame legs leading to the open corner, through the open ends of these legs. That patent contains the suggestion to fill the desiccant in metered amounts into the longer frame leg still to be bent (for forming the fourth corner) only to such an extent that the granulated material does not reach the bending site where the fourth corner is to be bent. But that patent does not contain any details as to how this should be accomplished.

It has also been proposed (see DE C-3,942,808) to fill a hollow profile strip in its entirety with granulated material and then blow and exhaust granulated material out of the hollow profile strip again to such a degree that the desired filling level is obtained. This blowing-out step proved to be disadvantageous, can be controlled only with difficulties, and moreover represents an additional working step which has an adverse effect on the cycle time, for example in the manufacture of spacer frames for insulating glass pares.

It has also been known from U.S. Pat. No. 4,660,271 to drill into a hollow profile strip filled with desiccant in the bending zone and suck out desiccant through the drilled holes to such an extent that the subsequent bending of the corner is not impeded by desiccant.

The present invention provides a process of the type discussed hereinabove by means of which hollow members, especially hollow profile strips for spacer frames for insulating glass panes, can be readily filled only up to the desired filling level, i.e. partially.

This object has been attained according to the invention by providing that a probe connected to a storage tank for granulated material is inserted in the hollow member to such an extent that its front end is located at the point in the hollow member up to which the latter is to be filled with granulated material; that the feeding of granulated material is discontinued as soon as the hollow member has been filled with granulated material up to the front end of the probe; and that the probe is thereupon pulled out of the hollow member.

The process of this invention is quite especially preferably applied to the filling of spacer frames with three corners, consisting of at least one hollow profile strip, the fourth corner of which is still open wherein the fourth corner can be formed by the feature that one of the two frame legs leading to the open corner is fashioned to be longer than the other and is bent, the free end then coming to lie beside the free end of the shorter frame leg.

The invention is also advantageous for spacer frames wherein at least one corner, for example the fourth corner, is closed by the insertion of a corner angle.

In either case, the hollow profile strip must not be filled in its entirety with desiccant. The longer leg may be filled only up to below the bending zone in order not to negatively affect the bending step (that the hollow profile might burst, or the desiccant is crushed into a powder). Even if the fourth corner is closed with the aid of a corner angle, both legs must not be entirely filled so that the corner angle can be inserted.

Also the shorter frame leg must not be totally filled in case the last corner, e.g. the fourth corner of a spacer frame, is formed by bending the longer frame leg, when closing of the frame takes place with the use of a linear connector inserted in the open ends, as known per se from U.S. Pat. No. 4,91 2,837, or by butt welding (see U.S. Pat. No. 4,704,51 2).

The preferred procedure is that the frame, after the filling step, is closed after bending the longer frame leg at the bending site by means of a linear connector or by welding the open ends together, if the process of this invention is applied for filling a spacer frame for insulating glass panes, formed from at least one hollow profile strip, with granulated desiccant wherein the spacer frame exhibits several corners, for example three corners, created preferably by bending and is left open at the last corner to be formed, for example the fourth corner; in this arrangement, granulated desiccant is filled in via the open ends of one frame leg or both frame legs leading to this open site and then the frame is finally sealed, wherein preferably one frame leg is longer than the other and the lengthened frame leg is filled up to below its bending site and/or the shortened frame leg is partially filled.

The invention furthermore relates to a process wherein the movement of granulated material in the probe is monitored and the filling step is discontinued as soon as the movement of granulated material in the probe ceases. This version of the process according to the invention can be still further developed by monitoring the movement of granulated material by means of a motion sensor associated with the conduit or with the probe.

It is preferred in the process of this invention to prevent efflux of granulated material from the probe, while the latter is pulled out of the hollow member, by applying a vacuum to the probe at a spacing from the free end thereof.

An apparatus especially suitable for carrying out the process of this invention, with a storage tank for granulated material and a holder for the hollow member to be filled, can be characterized according to the invention by the features that at least one probe introducible into the hollow member to be filled is provided; that the probe is in communication with the storage tank for granulated material by way of a conduit; that a sensor for monitoring movements of the granulated material is associated with the conduit or the probe; and that a conduit for the application of a vacuum is connected to the probe at a spacing from the free end of the latter.

The process according to this invention and the apparatus of this invention start with the realization that the feeding of granulated material through the probe into the hollow member, which latter is, for example, a hollow profile strip for spacer frames of insulating glass, ceases automatically once the filled-in granulated material has reached the end of the probe introduced into the hollow member. If the movement of granulated material in the probe or in a conduit connected upstream thereof is monitored, then the cessation of movement of granulated material in the probe or in the feed conduit can be utilized for producing a control signal which, for example, terminates the filling step.

Due to the fact that one embodiment of the invention provides that a vacuum is applied to the probe while it is pulled out of the hollow member and is held ready for introduction into the subsequent hollow member to be filled, any granulated material contained in the probe is prevented from flowing out and either being lost or filling the hollow member to a greater extent than desired. This is so because the application of a vacuum (a quite low vacuum is sufficient) has the effect that granulated material jams up in the manner of a plug between the connection point of the vacuum line and the open end of the probe:so that no granulated material, or practically none, can flow any longer from the probe. Once the vacuum is lifted again, the jamming action is eliminated, the plug disintegrates, and granulated material can again flow into a hollow member or a hollow profile strip.

The extent and the depth to which the probe is introduced into a hollow member or into a hollow profile strip can be adjusted in various ways. The advancement of the probe during introduction of the latter into the hollow member is either monitored by a displacement measuring device, or a stop is provided limiting the insertion depth of the probe into the hollow member or into the hollow profile strip. This stop can be a stop which comes into contact with the forward free end of the hollow member or of the hollow profile strip to be filled with granulated material. The stop can also be adjustable in order to set the introduction depth, i.e. the extent to which the hollow member or the hollow profile strip is filled with granulated material, to the desired value.

Figure 2:
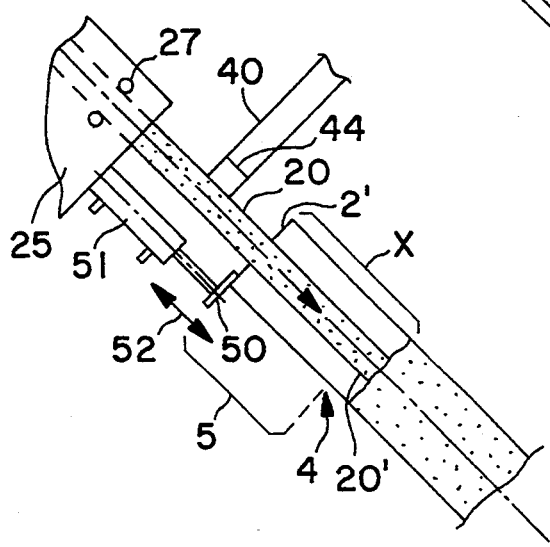
Figure 3:
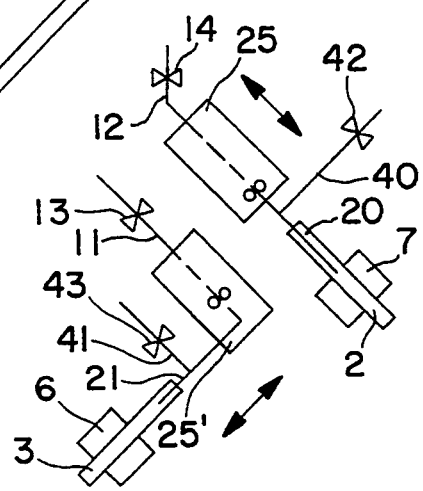

Additional details and features of the invention can be seen from the following description of the embodiments of an apparatus according to this invention illustrated in the drawings, by means of which the process of the invention can be executed. In the drawings:

FIG. 1 shows schematically an apparatus for filling spacer frames for insulating glass panes with granulated desiccant, FIG. 2 shows a probe on an enlarged scale, and FIG. 3 is/an embodiment with two probes movable independently of each other.

It is possible, for example, in accordance with the process of this invention and in the apparatus according to this invention, to fill spacer frames with granulated desiccant which frames are bent at three corners and the fourth corner of which is still open. Such spacer frames can be produced, for example, in the bending device known from U.S. Pat. No. 5,136,871 wherein the bending of the fourth corner for closing the spacer frame is first omitted. In such a case, one of the legs 2 of the spacer frame 1, leading to the still open corner, projects past the fourth corner still to be produced by the piece 5 by which the other leg 3 of the spacer frame 1, leading to the corner still to be produced, is shorter. After bending the projecting piece 5 at the site 4 where the corner is to be created, a closed spacer frame results, the butt joint of which lies in the region of the leg 3. The ends of the legs 2 and 3 at the butt joint are connected with each other by a plug connector, by welding, or by soldering.

Besides such spacer frames 1 produced by bending a hollow profile strip, it is possible to fill, according to the process of this invention or in the apparatus of this invention, hollow profile strips for spacer frames, or spacer frames, the corners of which are formed entirely or only partially by corner connectors inserted in the hollow profile strip sections.

The operating technique according to this invention can be utilized with advantage in all cases where comparatively narrow volume hollow members are to be filled with a granulated material partially, i.e. up to a desired extent (filling level).

The apparatus illustrated in FIG. 1 consists of a holder 6, 7 of any desired design for the spacer frame 1 wherein the holders 6, 7 are fashioned, for example, as clamps seizing the legs 2 and 3 of the spacer frame 1 leading to the open corner.

The apparatus of this invention furthermore comprises a storage tank 10 for granulated desiccant to be filled into the spacer frame 1. The granulated desiccant is conducted via conduits 11, 12, regulated by shutoff elements 13, 14, to two probes 20 and 21 which are introduced with their free ends into the legs 2 and 3 of the spacer frame 1 when the spacer frame 1 is to be filled with granulated desiccant.

The conduits 11, 12 leading to the probes 20, 21 pass, for example, through a joint holder 25 for the probes 20 and 21. Two sensors 26 and 27 are arranged at or in the holder, detecting the movement of granulated desiccant in the conduits 11, 12 and thus through the probes 20, 21 and transmitting a signal when the movement of granulated desiccant ceases. Examples of suitable sensors are described in U.S. Pat. Nos. 4,670,954 and 5,134,279.

The apparatus furthermore includes a control means 30 receiving, inter alia, signals from the above-mentioned sensors 26, 27 via the lines 31, 32 and, in turn, controlling the shutoff elements 13, 14 in the conduits 11, 12.

It is furthermore to be noted that conduits (not shown) can be connected to the conduits 11, 12 or to the probes 20, 21 through which a gas, e.g. dried air, can be injected enhancing the flow of granulated desiccant through the conduits 11,12 and through the probes 20, 21 into the legs 2 and 3 of the spacer frame 1.

Conduits 40, 41 leading to a vacuum source are connected to the probes 20 and/or 21. Shutoff elements 42, 43 are provided in the conduits 40, 41, the opening and closing motions of which are likewise controlled by the control means 30.

FIG. 2 shows on an enlarged scale once again the probe 20. FIG. 2 also shows that a plate 44, such as a screen or the like, is provided, in the zone of the orifice of the conduit 40 leading to the vacuum source, at the probe 20, this plate being gas-or air-permeable but preventing passage of granulated material. The plate 44 prevents granulated desiccant from being sucked out of the interior of the probe 20 into the conduit 40 during application of a vacuum to the conduit 40, i.e. with the shutoff element 42 being open.

FIG. 2 also shows that the insertion depth X of the probe 20 into the leg 2 of the spacer frame 1 can be determined by a stop 50 which latter, in the illustrated embodiment, is adjustable by a pressure medium motor 51 (arrow 52). Aside from such a stop 50 for limiting the insertion depth X of the probe 20 into the leg 2, it is also possible to provide fixed stops or measuring devices which measure the advance of the holder 25 with the probe 20 during introduction of the probe 20 into the leg 2 and terminate the feeding motion after reaching the desired introduction depth X.

In case of filling legs 2 of spacer frames 1 still to be bent for forming the fourth corner at the site 4, the probe 20 is inserted into the leg 2 to such an extent that its free forward end has a distance X from the open end 2' of the leg 2 through which the probe 20 has been inserted, this distance being somewhat longer than the length of the section 5 of the leg 2 to be bent for forming the corner at the site 4.

FIG. 3 shows furthermore an embodiment of the apparatus according to this invention wherein the two probes 20 and 21 are provided at separate holders 25 and 25'. This embodiment has the advantage that the probes 20 and 21 can be introduced independently of each other into the legs 2 and 3 of a spacer frame 1 leading to the open corner. This is of significance, for example, in case also the leg 3 of the spacer frame 1 is not to be filled entirely with granulated desiccant so as not to impede the butt welding step, or so as to permit the engagement of a linear connector for the final closing of the spacer frame 1 after bending the section 5 of the frame leg 2.

The mode of operation during the filling of a spacer frame 1 still open in one of its corners will be described hereinbelow The spacer frame 1 is inserted manually or mechanically in the apparatus and is retained therein by the clamps 6 and 7. In this arrangement, the spacer frame 1 is oriented preferably so that it is aligned substantially vertically, the still open corner pointing upwards. At this point, the probes 20 and 21 are introduced into the open ends of the legs 2 and 3 leading to the open corner to such an extent that the front ends of the probes 20 and 21 extend to the location into the legs 2 and 3 up to which the legs 2 and 3 are to be filled with granulated desiccant. This is illustrated in FIG. 2 for the probe 20, the introduction depth of the probe 20 therein being the distance X. After this has been done, granulated desiccant from the storage tank 10 is filled into the frame legs 2 and 3 by way of the probes 20, 21, optionally enhanced by an air or gas stream after opening the valves 13, 14.

As soon as the condition illustrated in FIG. 2 has been reached in the leg 2 of the spacer frame 1, wherein the granulated desiccant introduced into the interior of the leg 2 has reached the orifice 20' of the probe 20, i.e. the leg 2 of the spacer frame 1 has been filled with granulated desiccant up to the orifice 20' of the probe 20, the movement of granulated desiccant through conduit 12 and through probe 20 ceases. This is detected by the sensor 27 which operates, via the control means 30, the shutoff element 14 with a closing motion, and opens the shutoff element 42 in the vacuum conduit 40. Due to the fact that a vacuum is applied to the interior of the probe 20 via the conduit 40, granulated desiccant jams up in the interior of the probe 20 and thus forms a plug preventing the further efflux of granulated desiccant from the probe 20 pointing obliquely downwardly in the in-use position.

Analogous procedures apply with regard to the filling of the leg 3 of the spacer frame 1.

After both legs have thus been filed to the desired extent (i.e. up to the desired "height"), the probes 20 and 21 are pulled out of the open ends of the legs 2 and 3 of the spacer frame 1, with continued application of a vacuum thereto.

The spacer frame 1, thus filled with granulated desiccant, is now further processed by forming the fourth corner by bending the section 5 of the leg 2 (this is done, for example, directly within the apparatus by means of a bending device, not shown, see U.S. Pat. No. 4,91 2,837). The spacer frame is now closed up wherein the connection of the free ends of the hollow profile strip forming the spacer frame 1 can be effected either by a linear connector (see U.S. Pat. No. 4,91 2,837) or with the aid of a welding bond (see U.S. Pat. No. 4,704,51 2) in the filling device or in a subsequent apparatus.

It can be seen that it is possible to fill, by means of the apparatus according to the invention, hollow members, e.g. legs of spacer frames, or also hollow profile strips for the production of spacer frames, without any appreciable expenditure exactly up to the desired filling level with a granulated material—in case of spacer frames filled with granulated desiccant.

The mode of operation of this invention and the apparatus according to the invention offer considerable advantages over the procedure of filling a predetermined amount into the spacer frame or of using a filling step dependent on time in order to obtain a metered filling, which fills the hollow member only partially, since errors based on losses of granulated material or fluctuations in the flow velocity of the granulated material are avoided, and the actual filling level is taken into account at all times. The process of this invention avoids, for example, spacer frames for insulating glass panes being filled to an excessive extent or to an inadequate extent. Both conditions are disadvantageous since overfilling creates problems during bending of the fourth corner or during connection of the ends by a linear connector, by welding, or by soldering, and inadequate filling is undesirable insofar as the capacity of the desiccant filled into a spacer frame is reduced; this can have the consequence that the water-absorption capacity of the desiccant in the finished insulating glass pane is insufficient and the pane will show condensate on the inside, i.e. it will fog up.

The process according to this invention can also be performed in a correspondingly equipped facility for the production of spacer frames for insulating glass panes by multiple bending of hollow profile strips. For this purpose, the disclosed apparatus of this invention can be simply integrated into an apparatus for the production of spacer frames by the bending of hollow profile strips.

In summation, the invention can be represented as follows, for example:

A spacer frame consisting of a hollow profile strip bent three times and still open at the fourth corner, one leg 2 being longer than the other leg leading to the open corner, is filled via a probe 20 introduced into the leg 2 with granulated desiccant. The probe 20 extends with its front end 20' into the leg 2 up to the desired filling level. As soon as the desiccant in leg 2 has reached the probe 20, the feeding flow of desiccant ceases. This is detected by a sensor 27. The sensor 27 actuates the pulling out of the probe 20. During this step, a vacuum is applied to the probe 20 via a conduit 40 so that no desiccant can exit any more from the probe 20.

What is claimed is:

1. A process for partial filling of hollow member with granulated material, comprising inserting a probe connected to a storage tank for granulated material into a hollow member to such an extent that a forward end of the probe is located at a point in the hollow member up to which the hollow member is to be filled with granulated material; feeding granulated material from said storage tank through said probe into said hollow member; discontinuing the feeding of granulated material as soon as the hollow member has been filled with granulated material up to said forward end of the probe; and thereafter pulling the probe out of the hollow member.

2. A process according to claim 1, wherein the movement of granulated material in the probe is monitored, and said feeding is interrupted as soon as the movement of granulated material in the probe has ceased.

3. A process according to claim 2, wherein the movement of granulated material during said feeding is monitored by means of a motion sensor.

4. A process according to claim 1, wherein during pulling out of the probe from the hollow member, a vacuum is applied to the probe at a spacing from the forward end of the probe.

5. A process according to claim 1, wherein the hollow member is a spacer frame having three corners and two open ends, with one frame leg including one of said open ends, and another frame leg including said other open end, said one frame leg being longer than said another frame leg, and wherein said granulated material is granulated desiccant, said process further comprising filling said desiccant into the spacer frame such that a portion of said longer leg is left empty, bending the longer leg in the vicinity of said empty portion, and closing the frame by joining said open ends of said frame together.

6. Apparatus for partially filling hollow members with granulated material, comprising a storage tank (10) for granulated material and a holder (6, 7) for a the hollow member (1) to be filled, at least one probe (20, 21) having a free end introducible into the hollow member (1) to be filled, said at least one probe (20, 21) communicating with the storage tank (10) for granulated material by way of a conduit (11, 12); and a conduit (40, 41) for the application of a vacuum connected to said at least one probe (20, 21) at a spacing from said free end.

7. Apparatus according to claim 6, further comprising an adjustable depth stop (50) for limiting the introduction depth of said at least one probe (20, 21) into the hollow member (1).

8. Apparatus according to claim 6, wherein said at least one probe (20, 21) is retained on a holder (25, 25') which, upon introduction of said at least one probe (20, 21) into the hollow member (1) through an open end (2') of the latter, is displaceable by a preselectable distance (X).

9. Apparatus according to claim 6, wherein an air-permeable but granule-impermeable wall portion (44) is provided on a wall of said at least one probe (20, 21) at the junction point of the conduit (40, 41) for applying a vacuum.

10. Apparatus according to claim 6, wherein the hollow member is a frame having two open-ended legs, and a holder (6, 7) is provided for the fixed positioning of the frame legs (2, 3), and two probes (20, 21) are provided which are introducible one into each of the open ends of the frame legs (2, 3).

11. Apparatus according to claim 10, wherein the probes (20, 21) are mounted on a single supported (25).

12. Apparatus according to claim 10, wherein the probes (20, 21) are each mounted on a separate holder (25, 25') and the holders are movable independently of each other and are guided on a machine frame so that they can be introduced into the open frame legs (2, 3) to varying distances.

13. Apparatus according to claim 6, wherein a control means (30) is provided to which a signal is transmitted from a sensor (26, 27) of the movement of granulated material in at least one of said communicating conduit (11, 12) and said at least one probe (20, 21), as soon as the sensor detects an interruption in the movement of granulated material in said at least one of said communicating conduit (11, 12) and said at least one probe (20, 21); and a shutoff element (13, 14) in the communicating conduit (11, 12) between said at least one probe (20, 21) and the storage tank (10) for granulated material; said control means (30) transmitting a signal that triggers the closing of said shutoff element (13, 14) and that effects withdrawal of said at least one probe (20, 21) and that simultaneously effects the application of vacuum to said at least one probe (20, 21).

* * * * *